(12) United States Patent
Kurz et al.

(10) Patent No.: US 11,308,652 B2
(45) Date of Patent: Apr. 19, 2022

(54) RENDERING OBJECTS TO MATCH CAMERA NOISE

(71) Applicant: Apple Inc., Cupertino, CA (US)

(72) Inventors: Daniel Kurz, Sunnyvale, CA (US); Tobias Holl, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 131 days.

(21) Appl. No.: 16/740,972

(22) Filed: Jan. 13, 2020

(65) Prior Publication Data
US 2020/0273212 A1 Aug. 27, 2020

Related U.S. Application Data

(60) Provisional application No. 62/809,815, filed on Feb. 25, 2019.

(51) Int. Cl.
*G06T 11/00* (2006.01)
*G06T 19/00* (2011.01)

(52) U.S. Cl.
CPC ............ *G06T 11/00* (2013.01); *G06T 19/006* (2013.01); *G06T 2200/32* (2013.01)

(58) Field of Classification Search
CPC ........ G06F 3/012; G06T 11/00; G06T 11/001; G06T 19/006; G06T 2200/32
USPC ...................................................... 345/633
See application file for complete search history.

(56) References Cited

U.S. PATENT DOCUMENTS

| | | | |
|---|---|---|---|
| 7,926,590 B2 | 4/2011 | Eriksen et al. | |
| 9,497,389 B2 | 11/2016 | Kasahara | |
| 9,741,145 B2 | 8/2017 | Mitchell et al. | |
| 2009/0144137 A1 | 6/2009 | Moulton et al. | |
| 2011/0216089 A1* | 9/2011 | Leung | G06K 9/3216 345/633 |
| 2013/0257908 A1* | 10/2013 | Ota | G06T 19/006 345/633 |
| 2016/0379341 A1* | 12/2016 | Domanski | H04N 13/111 382/154 |
| 2017/0262045 A1 | 9/2017 | Rouvinez et al. | |
| 2018/0007333 A1* | 1/2018 | Lim | H04N 9/67 |
| 2018/0077400 A1* | 3/2018 | Ayari | G06T 17/20 |
| 2018/0182071 A1* | 6/2018 | Ayari | G06N 3/08 |

FOREIGN PATENT DOCUMENTS

WO WO 2018002910 1/2018

OTHER PUBLICATIONS

Fischer, J. et al., "Enhanced Visual Realism by Incorporating Camera Image Effects," IEEE/ACM International Symposium on Mixed and Augmented Reality, IEEE, pp. 205-208 (2006).

(Continued)

*Primary Examiner* — Jacinta M Crawford
(74) *Attorney, Agent, or Firm* — Thompson Hine LLP

(57) ABSTRACT

Various implementations disclosed herein render virtual content with noise that is similar to or that otherwise better matches the noise found in the images with which the virtual content is combined. Some implementations involve identifying noise data for an image, creating a parameterized noise model based on the noise data, generating a noise pattern approximating noise of the image or another image using the parameterized noise model, and rendering content that includes the image and virtual content with noise added based on the noise pattern.

20 Claims, 6 Drawing Sheets

FIG. 6

(56) References Cited

OTHER PUBLICATIONS

Klein, G. and Murray, D.W., "Simulating Low-Cost Cameras for Augmented Reality Compositing," IEEE Transactions on Visualization and Computer Graphics, vol. 16, No. 3, pp. 369-380 (2010).
German Patent and Trademark Office, Office Action (with English Translation), German Patent Application No. 10 2020 104 055.5, 20 pages (dated Sep. 4, 2020).

\* cited by examiner $$\sigma^2 = \sigma_m^2 \left( \sum_{i=1}^{N} \frac{w_i^2}{4\pi\sigma_{gi}^2} + \sum_{j=1}^{N}\sum_{i=1}^{j-1} \frac{w_i w_j}{\pi(\sigma_{gi}^2 + \sigma_{gj}^2)} \right)$$

$$R_x(\tau) = \sum_{i=1}^{N} \frac{w_i^2}{4\pi\sigma_{gi}^2} e^{-\frac{\tau^2}{4\sigma_{gi}^2}} + \sum_{j=1}^{N}\sum_{i=1}^{j-1} \frac{w_i w_j}{\pi(\sigma_{gi}^2 + \sigma_{gj}^2)} e^{-\frac{\tau^2}{2(\sigma_{gi}^2 + \sigma_{gj}^2)}}$$

RENDERING OBJECTS TO MATCH CAMERA NOISE

CROSS-REFERENCE TO RELATED APPLICATIONS

This Application claims the benefit of U.S. Provisional Application Ser. No. 62/809,815 filed Feb. 25, 2019, which is incorporated herein in its entirety.

TECHNICAL FIELD

The present disclosure generally relates to providing content on electronic devices, and in particular, to systems, methods, and devices for providing content that includes image content and virtual content with similar noise.

BACKGROUND

Some augmented reality (AR) systems capture a video stream and combine images of the video stream with virtual content. The images of the video stream can be very noisy, especially in lower light condition in which certain ISO settings are used to boost image brightness. In contrast, since the virtual content renderer does not suffer from the physical limitations of the image capture device, there is little or no noise in the virtual content. In the AR content that combines the images of real content with the virtual content, noise can be seen on the real objects but is generally missing from the virtual content. The lack of the appearance of noise, e.g., graininess, strength, its property variations between color channels, etc., on virtual content can result in the virtual content appearing to float, look detached, stand out, or otherwise fail to fit with the real content. For example, FIG. 4 depicts content 400 in which a real object 402 has a noisy appearance and virtual object 404 has a significantly less noisy appearance. Existing systems and techniques do not adequately account for image noise in presenting virtual content with image content in AR and other content that combines virtual content with real image content.

SUMMARY

As discussed above, existing systems and techniques do not adequately account for image noise in presenting virtual content with captured image content. Various implementations disclosed herein include devices, systems, and methods for rendering virtual content with noise that is similar to or that otherwise better matches the noise found in the images with which the virtual content is combined.

In some implementations, an electronic device uses a processor to perform a method. The method involves identifying noise data for a first image captured by an image capture device. The method creates a parameterized noise model based on the noise data. In some implementations, the parameterized noise model is created by identifying parameters for a noise model such that the noise model output is similar to or otherwise matches with the noise data. After creating an appropriate parameterized noise model (e.g., by identifying appropriate parameters for a Gaussian mixture model, polynomial representation, parameterized histogram, etc.), the method generates a noise pattern approximating noise of a second image using the parameterized noise model and renders computer-generated reality (CGR) content that includes the virtual content with noise added based on the noise pattern. The noise in the content is relatively consistent, e.g., relatively similar for both the real objects and the virtual objects. The CGR content may include the second image or be composited with the second image, or the CGR content may be composited with a third image.

In some implementations, the second image is the first image, e.g., the same image is used to create the parameterized noise model and included in the CGR content. In these implementations, referred to herein as "live parameter generation" implementations, the parameterized noise model is created live, e.g., during the CGR experience, and no prior learning phase is needed.

In other implementations, the second image is different from the first image, e.g., a different image or images is used to create the parameterized noise model than the image or images that are included in the CGR content. For example, in some implementations, during a learning phase prior to the CGR experience, for a given camera, camera settings, and various signal-to-noise ratio (SNR) levels, the method identifies model parameters based on images captured by the image capture device in a variety of lighting conditions, e.g., identifying a first set of model parameters for the camera settings and SNR level $S_1$, a second set of model parameters for SNR level $S_2$, etc. In such implementations, given these stored SNR level-to-model parameter associations for a given camera setting, appropriate model parameters for a given live image can be looked up and used to generate an appropriate noise pattern at runtime. For example, the method may receive a live image and an associated SNR level (e.g., from an image signal processor (ISP) or machine learning analysis), lookup corresponding model parameters, and then use the parameterized model with those model parameters to generate an appropriate noise pattern for virtual content to be combined with the image. In these implementations, referred to herein as "live parameter lookup" implementations, the parameterized noise model along with model parameters for multiple noise levels (e.g., SNR levels) are created during a prior learning phase, e.g., before the CGR experience begins and, during the live CGR experience, an image's camera settings and noise level (e.g., SNR level) is used to lookup appropriate model parameters. Looking up appropriate model parameters during a live CGR experience (e.g., live parameter lookup) rather than identifying new model parameters during the experience (e.g., live parameter generation) may provide advantages. For example, doing so may avoid computationally expensive optimizations or other processes that may otherwise be used to identify live model parameters during the CGR experience. This may reduce runtime computation and resource usage and thus may improve the functioning and efficiency of the CGR system.

The noise pattern that is generated can be used to add noise to virtual content that will be combined with image content in various ways. For example, the noise pattern may be tiled over the surface area of a virtual object that is inserted on a depiction of a real table in the CGR content. The noise added to the virtual content will generally be similar to the real noise in the image since the noise added to the virtual object is created based on the noise pattern. In some implementations, the noise pattern may be randomly tiled (e.g., at random positions, using tiles of random size, etc.) over the surface of virtual content. Such randomness may help avoid similarity in noise added to the virtual content over a sequence of images or frames. In other words, just as real noise randomly changes from frame to frame of a video sequence, the noise added to virtual content will randomly change from frame to frame.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
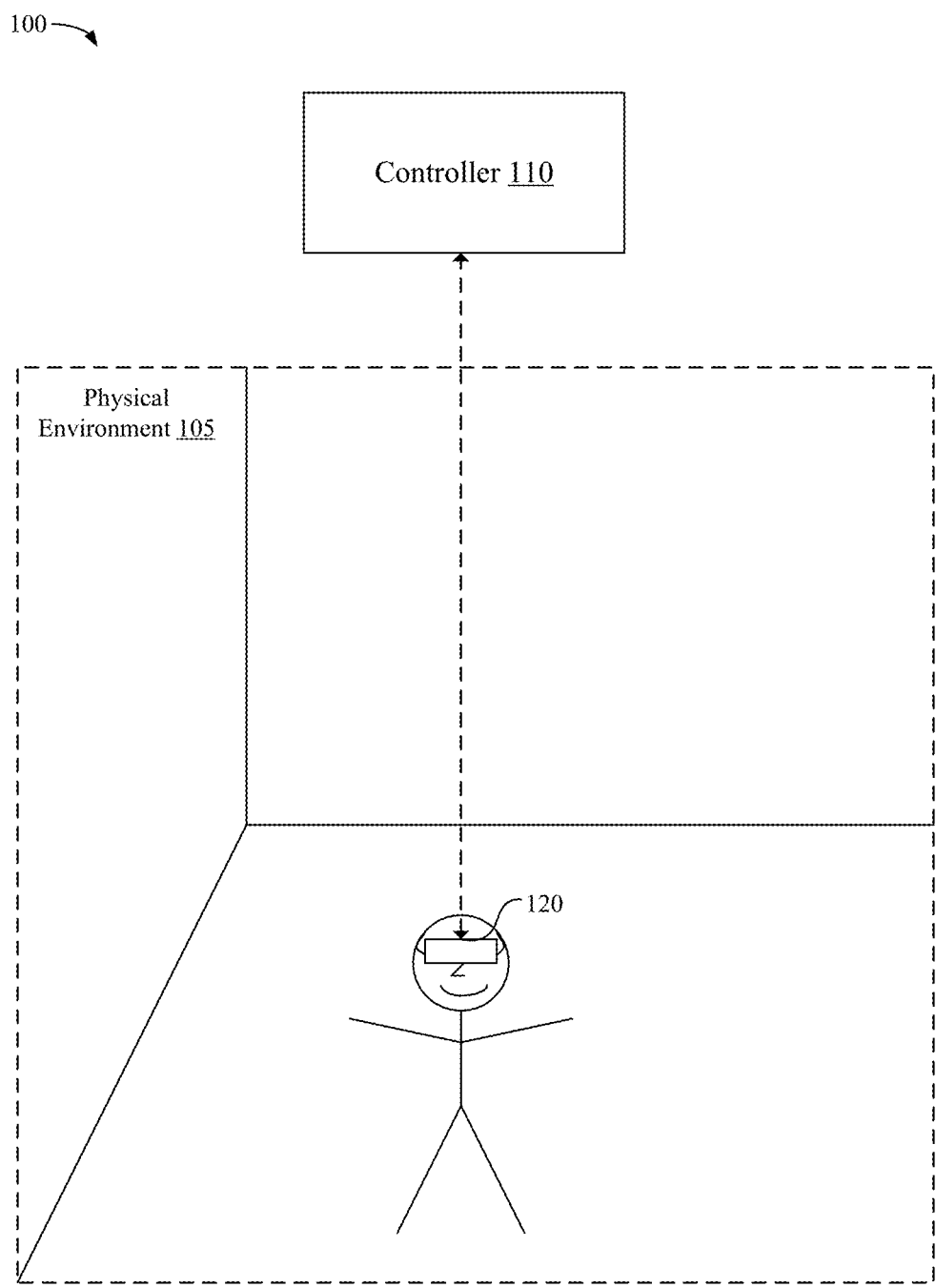
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Figure 2:
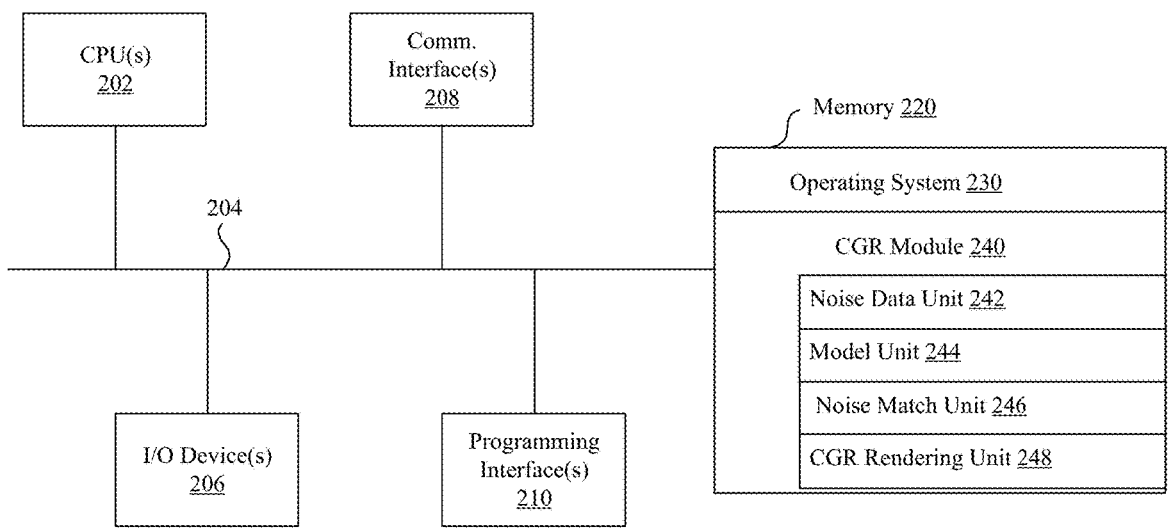
FIG. 2 is a block diagram of an example controller in accordance with some implementations.
Figure 3:
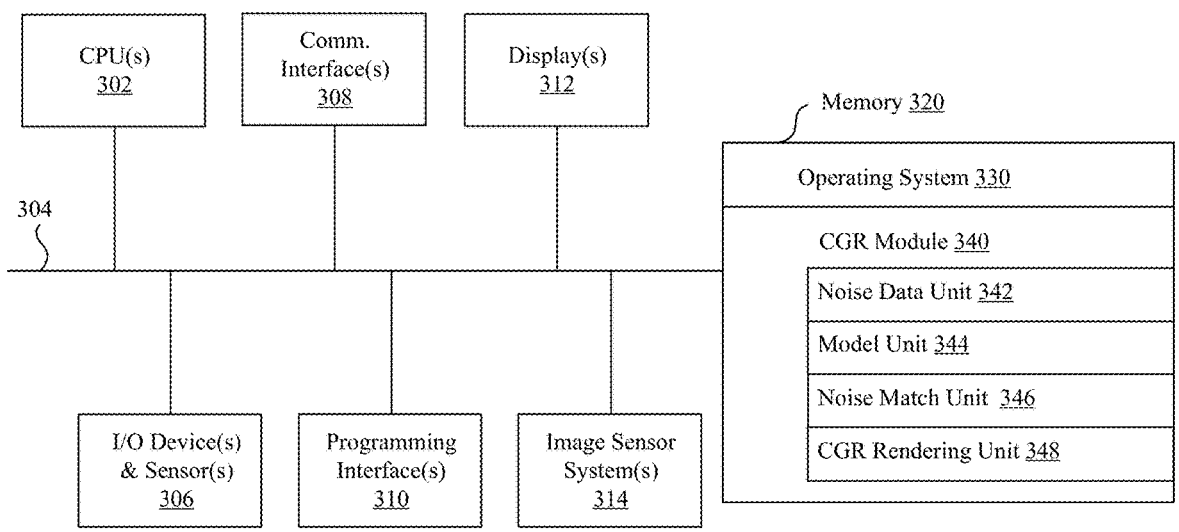
FIG. 3 is a block diagram of an example head-mounted device (HMD) in accordance with some implementations.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein. While FIGS. 1-3 depict exemplary implementations involving a head mounted device (HMD), other implementations do not necessarily involve an HMD and may involve other types of devices including, but not limited to, watches and other wearable electronic devices, mobile devices, laptops, desktops, gaming devices, home automation devices, and other devices that include or use image capture devices.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and a head-mounted device (HMD) 120, one or both of which may be in a physical environment. A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In some implementations, the controller 110 is configured to manage and coordinate a computer-generated reality (CGR) experience for the user. In some implementations, the controller 110 includes a suitable combination of software, firmware, or hardware. The controller 110 is described in greater detail below with respect to FIG. 2. In some implementations, the controller 110 is a computing device that is local or remote relative to the physical environment 105.

In one example, the controller 110 is a local server located within the physical environment 105. In another example, the controller 110 is a remote server located outside of the physical environment 105 (e.g., a cloud server, central server, etc.). In some implementations, the controller 110 is communicatively coupled with the HMD 120 via one or more wired or wireless communication channels 144 (e.g., BLUETOOTH, IEEE 802.11x, IEEE 802.16x, IEEE 802.3x, etc.).

In some implementations, the HMD 120 is configured to present the CGR experience to the user. In some implementations, the HMD 120 includes a suitable combination of software, firmware, or hardware. The HMD 120 is described in greater detail below with respect to FIG. 3. In some implementations, the functionalities of the controller 110 are provided by or combined with the HMD 120, for example, in the case of an HMD that functions as a stand-alone unit.

According to some implementations, the HMD 120 presents a computer-generated reality (CGR) experience to the user while the user is present within the physical environment 105. A computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image capture devices or other sensors, one or more displays, or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and computer-generated reality (CGR) module 240.

The operating system 230 includes procedures for handling various basic system services and for performing hardware dependent tasks.

In some implementations, the computer-generated reality (CGR) module 240 includes a noise data unit 242, a model unit 244, a noise match unit 246, and an CGR rendering unit 248. The noise data unit 242 measures or otherwise creates a representation of the noise in an image. The model unit 244 creates a parameterized noise model based on noise data. For example, the model unit 244 may identify parameters for a noise model that describes the spatial noise correlation as a convolution with a Gaussian mixture kernel that produces output that is similar to the noise of an image.

The noise match unit 246 uses the parameterized noise model to generate noise, e.g., a noise pattern, that is similar to the noise of a particular image. In some implementations, signal-to-noise ratio (SNR) levels or other camera parameters are associated with parameters for the parameterized noise model during a learning phase and the noise match unit 246 identifies a SNR level for an image, looks up the corresponding parameters, and generates a noise pattern using the parameters.

The CGR rendering unit 248 combines image content with virtual content to provide an CGR experience, e.g., providing a view of an CGR environment for a user. The CGR rendering unit 248 may adjust the appearance of the image content or the virtual content. In some implementations, the CGR rendering unit adds noise to the virtual content that is similar to noise of the image content with which the virtual content is being combined. The added noise may be based on a noise pattern provided by the noise match unit 246 for the corresponding image.

Although these modules and units are shown as residing on a single device (e.g., the controller 110), it should be understood that in other implementations, any combination of these modules and units may be located in separate computing devices. Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

FIG. 3 is a block diagram of an example of the head-mounted device (HMD) 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the HMD 120 includes one or more processing units 302 (e.g., microprocessors, ASICs, FPGAs, GPUs, CPUs, processing cores, or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 310, one or more displays 312, one or more interior or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 312 are configured to present an CGR experience to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 312 correspond to diffractive, reflective, polarized, holographic, etc. waveguide displays. For example, the HMD 120 includes a single display. In another example, the HMD 120 includes a display for each eye of the user.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a computer-generated reality (CGR) module 340.

The operating system 330 includes procedures for handling various basic system services and for performing hardware dependent tasks.

In some implementations, the computer-generated reality (CGR) module 340 includes a noise data unit 342, a model unit 344, a noise match unit 346, and an CGR rendering unit 348. The noise data unit 342 measures or otherwise creates a representation of the noise in an image. The model unit 344 creates a parameterized noise model based on noise data. For example, the model unit 344 may identify parameters for a Gaussian mixture model such that the Gaussian mixture model produces output that is similar to the noise of an image.

The noise match unit 346 uses the parameterize noise model to generate noise, e.g., a noise pattern, that is similar to the noise of a particular image. In some implementations, signal-to-noise ratio (SNR) levels are associated with parameters for the parameterized noise model during a learning phases and the noise match unit 346 identifies a SNR level for an image, looks up the corresponding parameters, and generates a noise pattern using the parameters.

The CGR rendering unit 348 combines image content with virtual content to provide an CGR experience, e.g., providing a view of a CGR environment for a user. The CGR rendering unit 348 may adjust the appearance of the image content or the virtual content. In some implementations, the CGR rendering unit adds noise to the virtual content that is similar to noise of the image content with which the virtual content is being combined. The added noise may be based on a noise pattern provided by the noise match unit 346 for the corresponding image.

Moreover, FIG. 3 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 4:
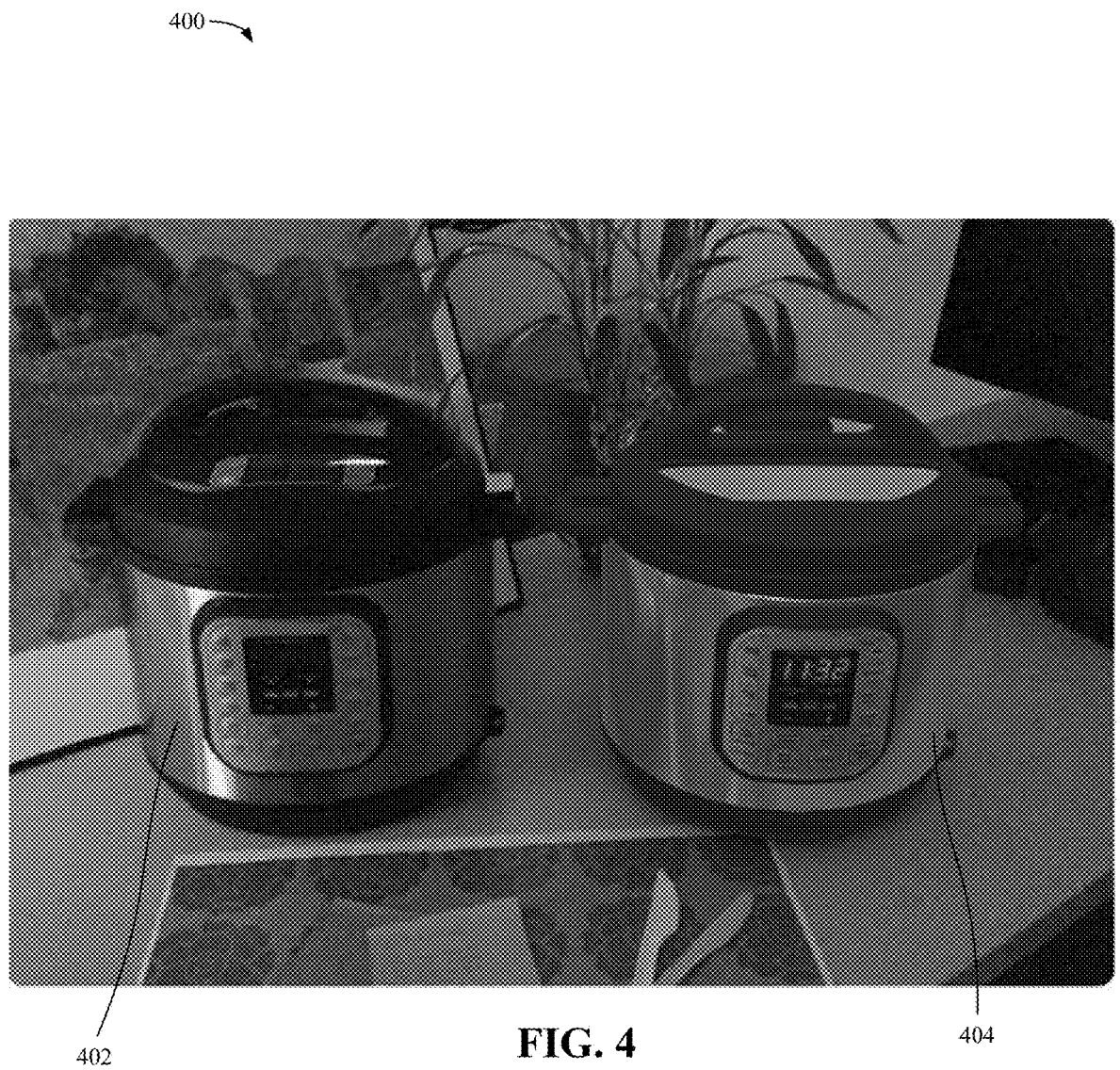
FIG. 4 illustrates CGR content in which the virtual content does not have noise that matches the noise of the depictions of realworld content.

FIG. 4 illustrates CGR content 400 in which the virtual content 404 (e.g., the virtual cooking appliance) does not have noise that matches the noise of the depictions of the real world content 402 (e.g., the real world cooking appliance). For example, the depiction of the real world content 402 has a noisy/grainy appearance consistent with the noise in the rest of the image. In contrast, the virtual content 404, which is a virtual version of the same type of appliance as real object 402, has a significantly smoother and otherwise less noisy appearance.

Figure 5A:
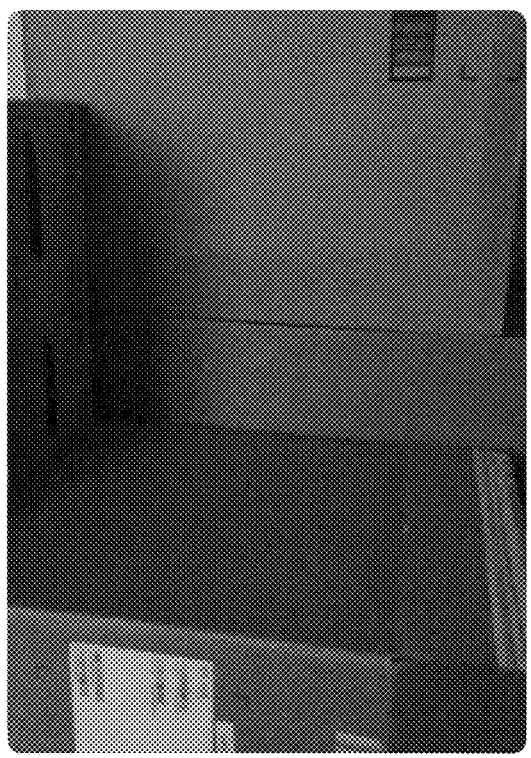
FIGS. 5A, 5B, and 5C illustrate differences between CGR content with virtual content without noise and CGR content with virtual content with noise added according to some implementations.
Figure 5B:
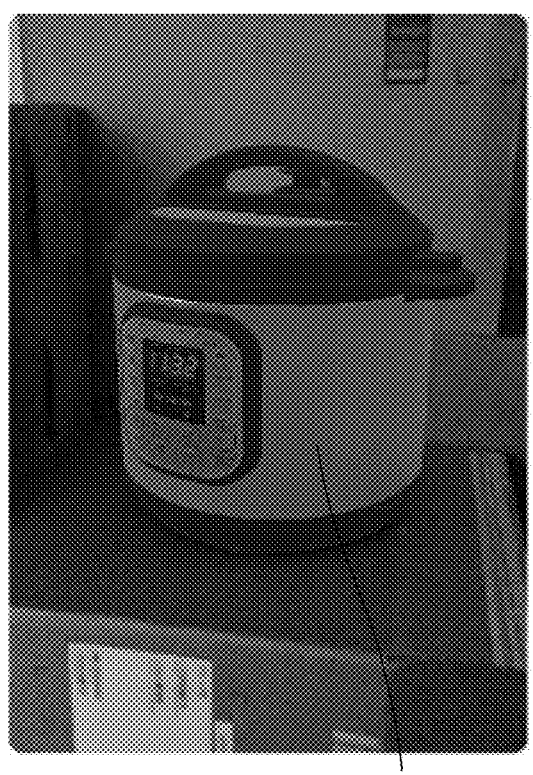
Figure 5C:
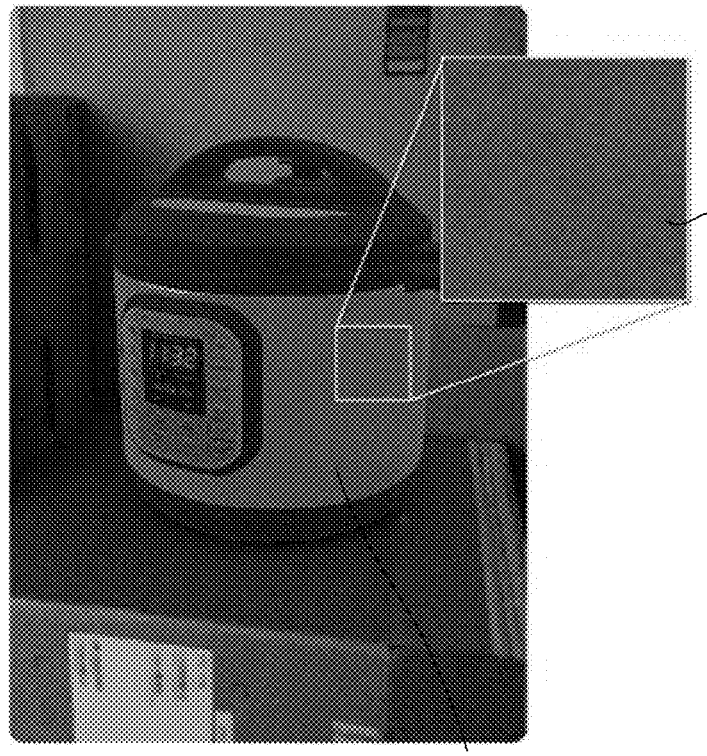

FIGS. 5A, 5B, and 5C illustrate differences between CGR content that includes virtual content without noise and CGR content that includes virtual content with noise added according to some implementations. FIG. 5A depicts an image of real world content from a physical environment. FIG. 5B depicts an example of CGR content in which a virtual object 502 has been combined with the image of the real world content of FIG. 5A. FIG. 5C depicts an example of CGR in which the virtual object 504 has been adjusted with added noise and then combined with the image of the real world content of FIG. 5A. As can be seen by comparing the figures, the virtual object 504 of FIG. 5C has noise (as illustrated in close-up view 506) that is similar to the noise in the real world content while the virtual object 502 of FIG. 5B lacks such noise. The virtual object 502 may appear to float, look detached, stand out, or otherwise fail to fit with the real content more than the virtual object 504.

Figure 6:
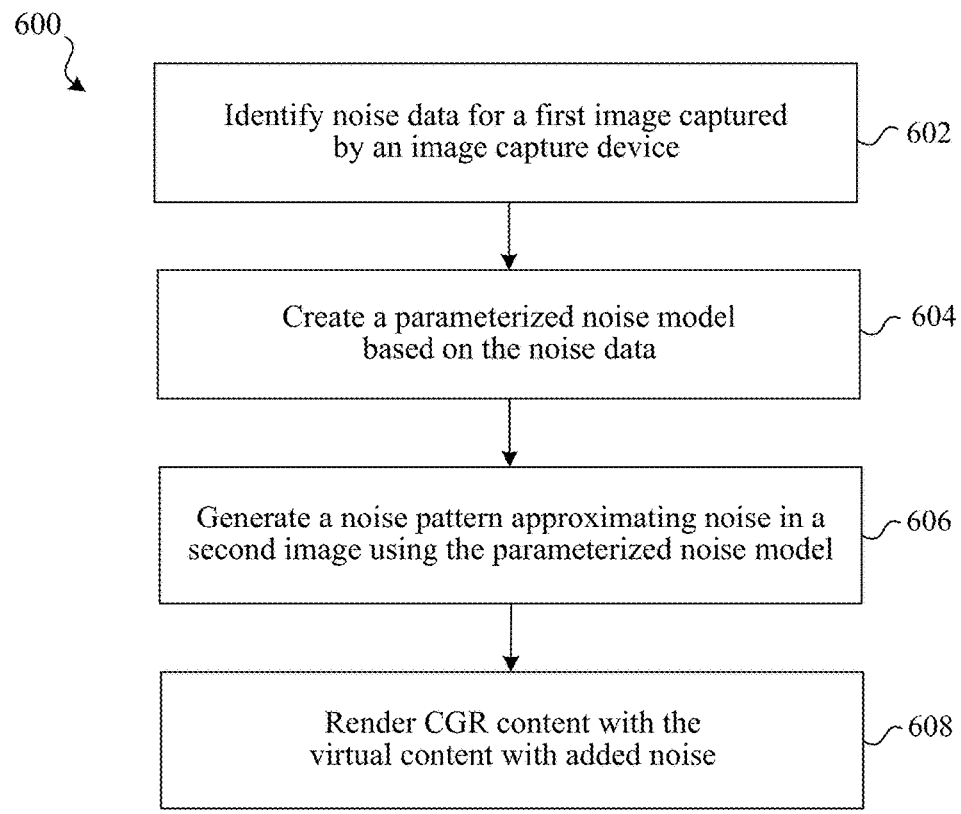
FIG. 6 is a flowchart illustrating an exemplary method for rendering virtual content with noise that is similar to or that otherwise better matches the noise found in the images with which the virtual content is combined, according to some implementations.

FIG. 6 is a flowchart illustrating an exemplary method 600 for rendering virtual content with noise that is similar to or that otherwise better matches the noise found in the images with which the virtual content is combined. In some implementations, the method 600 is performed by a device (e.g., controller 100 or HMD 120 of FIGS. 1-3). The method 600 can be performed at a mobile device, head mounted device (HMD), desktop, laptop, server device, or by multiple devices in communication with one another. In some implementations, the method 600 is performed by processing logic, including hardware, firmware, software, or a combination thereof. In some implementations, the method 600 is performed by a processor executing code stored in a non-transitory computer-readable medium (e.g., a memory).

Figure 7:
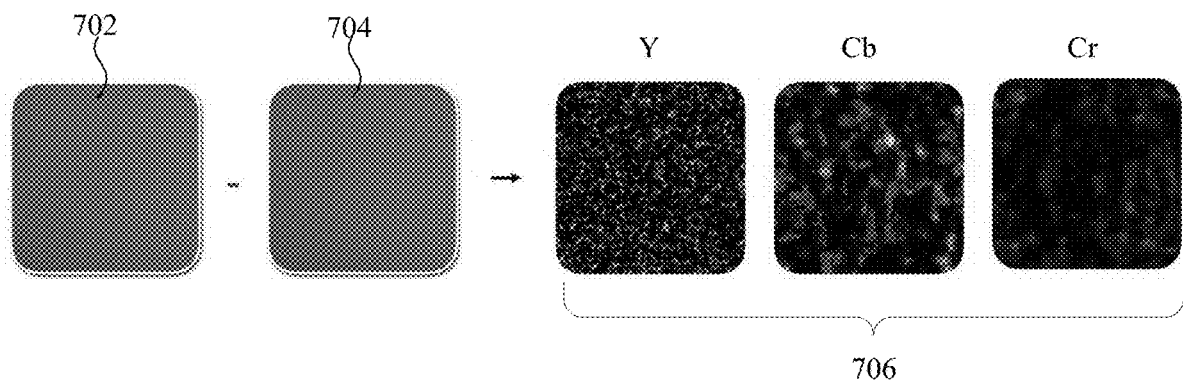
FIG. 7 is a block diagram illustrating an exemplary technique for measuring image capture device noise.

At block 602, the method 600 identifies noise data (e.g., measuring camera noise in an image) for a first image captured by an image capture device. FIG. 7 is a block diagram illustrating an exemplary technique for measuring image capture device noise. In this example, identifying the noise data involves creating a difference image 706 using two noisy images 702, 704 captured by the image capture device at the same light level, e.g., by subtracting the pixel values of one image from those of the other image. In one implementation, the images used to build the difference images are red-green-blue (RGB) images and the difference image is built and converted into a YCbCr color space. The noise data can be separated into different channels/components, e.g., luma Y, blue-difference chroma component Cb, red-difference chroma component Cr, etc. Decomposing a color image into multiple channels to determine noise per channel can provide various benefits in some implementations. Adding one type of noise (e.g., luminance noise) may be perceptually more pleasing than adding another type of noise (e.g., color noise). Moreover, some of the noise may have been the result of post processing (e.g., smoothing effects, etc.) that affects one channel (e.g., the color channel) more than another channel (e.g., the luminance channel), leaving the luminance channel with more noise that is finer grained and leaving the color channels with subtle noise that is perceived as coarser grained colored blobs. In some cases, fine-grained noise of one type (e.g., luminance noise) hides the noise of another type (e.g., color noise). In short, separating noise into multiple channels can ultimately help ensure that the noise that is ultimately created to simulate that noise will be similar to the real noise.

In another implementation, the noise data is identified by taking a sequence of multiple images for a given light level, averaging the noise in the multiple images, and then comparing one of the images against the average.

The noise data may be obtained for a plurality of different SNR levels as part of a learning phase that builds a data set of SNR-to-parameter associations for later use in quick SNR-based lookup. In some implementations, identifying the noise data comprises measuring camera noise for a plurality of different SNR levels using images captured by the image capture device in different lighting or imaging conditions.

At block 604, the method 600 creates a parameterized noise model based on the noise data. The parameterized noise data may be created by identifying parameters of a noise model to fit the noise model to the noise data.

Figure 8:
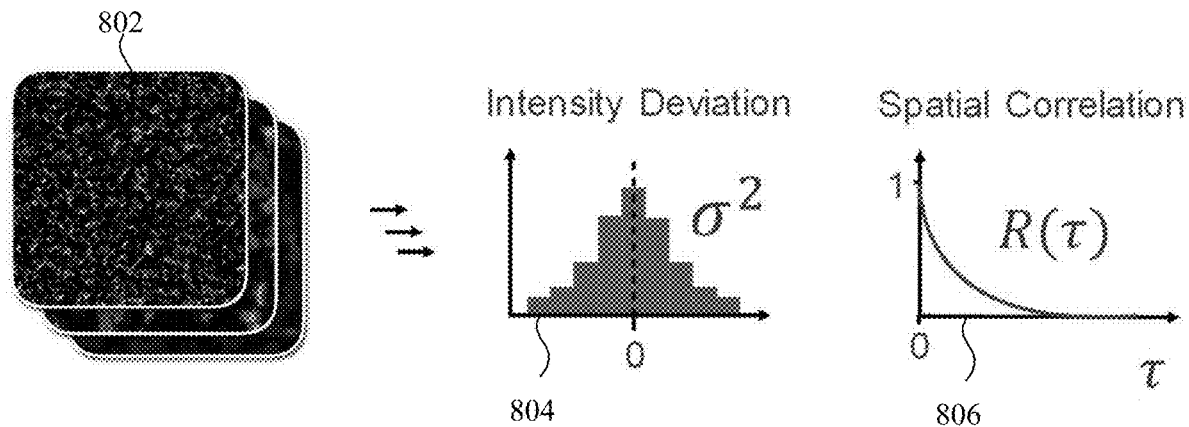
FIG. 8 is a block diagram illustrating an exemplary technique for building a parameterized noise model.
Figure 8:
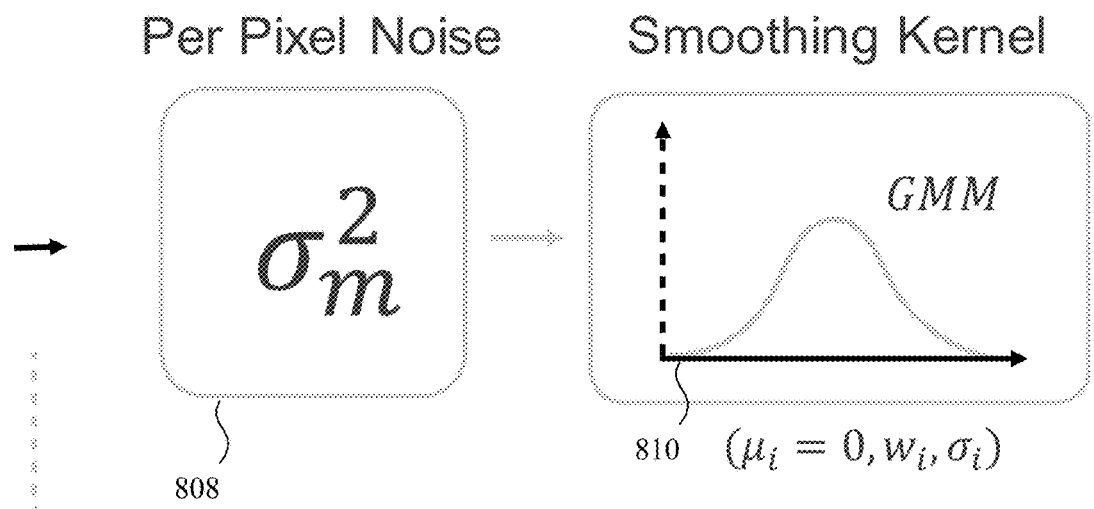

FIG. 8 is a block diagram illustrating an exemplary technique for creating a parameterized noise model based on noise data. In this example, the noise model parameters are determined by determining a per pixel intensity deviation 804 using the noise data 802. The patterns of the per pixel intensity deviation can be shifted against each other and used to compute a correlation, e.g., spatial correlation 806, which provides information about the noise, e.g., measuring how blobby versus grainy the noise is in the image. The spatial correlation function provides statistical information about the noise, e.g., based on how much correlation there is in the noise when it is spatially shifted against itself. The method may perform a calculation (e.g., an optimization) to identify parameters (e.g., per pixel noise 808 and smoothing kernel 810) for a parameterized noise model (e.g., a Gaussian mixture model, a polynomial representation, parameterized histogram, etc.) to produce noise output with characteristics similar to the spatial correlation 806 or the intensity deviation distribution.

The image may have been previously smoothed, e.g., using smoothing kernel that uses a Gaussian mixture model, which may provide or add to spatial correlation in the noise in the image. Using the same type of model (e.g., a Gaussian mixture model) for the parameterized noise model to produce noise patterns may facilitate better matching to the noise in the image.

Returning to FIG. 6, creating the parameterized noise model may be performed during an CGR experience or prior to an CGR experience. For example, in a live parameter generation implementation, creating the parameterized noise model may be performed during an CGR experience. In another example, in a live parameter lookup implementation, creating the parameterized noise model may be performed prior to an CGR experience. In some live parameter lookup implementation, for a given camera and various SNR levels, during a training phase, the method 600 identifies noise model parameters based on images captured by the camera in a variety of lighting conditions to provide SNR-to-parameter associations that can later be used to lookup appropriate parameters for given image SNR levels. In other implementations, during a training phase, the method 600 precomputes and stores noise patterns for numerous different light intensities, image capture devices, and combinations thereof and then during the live CGR experience, these patterns can be looked up based on light intensity detection and image capture device identification. Implementations that store SNR-to-parameter associations or other parameter-based associations may require less storage than implementations that store the pattern textures that could be generated based on a parameterized model. In other words, there may be storage, efficiency, and other advantages to storing parameters rather than pattern textures.

At block 606, the method 600 generates a noise pattern approximating noise in a second image using the parameterized noise model.

In live parameter generation implementations, the second image may be the first image, e.g., the noise model parameters are determined using the actual image that will be included in the CGR experience. In such implementations, a prior learning phase is not needed to determine SNR-to-parameter associations since the parameters can be determined during the live CGR experience.

In contrast to live parameter generation implementations, in live parameter lookup implementations, the second image (e.g., the image included in the CGR) is different from the first image (e.g., the image used to create the parameterized model). In such implementations, SNR-to-parameter associations can be determined during a learning phase prior to the CGR experience. Since different image capture devices produce noise differently, the learning process may be performed on individual devices to determine SNR-to-parameter associations for each individual device. The SNR-to-parameter associations may be stored and then used to determine noise patterns for later/live images such as the second image. For example, a second image may be captured by an image capture device during an CGR experience for inclusion in the CGR experience. The method 600 may determine the second image's SNR, for example, by receiving the SNR level from an image signal processor (ISP) or using a machine learning model that assesses the second image. The method 600 may use the SNR to lookup the associated parameters that can then be used to determine the noise pattern using the parameterized noise model. For SNR levels for which no associated parameters are available, the parameters may be interpolated using the available parameters in the SNR-to-parameter associations. Live parameter lookup implementations may be more efficient or faster and thus more feasible at runtime than some live parameter generation implementations.

In some implementations, noise patterns are precomputed and stored for multiple SNR levels, e.g., as SNR-to-noise pattern associations, and the noise pattern for a given SNR level is looked up at runtime. This may involve estimating parameters prior to runtime, using the parameters prior to runtime to pre-generate a set of noise patterns for SNR levels or ranges (e.g., an SNR range where the video stream shows possible noise), and then looking up or interpolating noise patterns at runtime. For SNR levels for which no associated noise patterns are available, the noise pattern may be interpolated using the stored noise patterns in the stored SNR-to-noise pattern associations.

At block 608, the method 600 renders computer-generated reality (CGR) content with the virtual content with added noise. The virtual content may include noise that was added based on the noise pattern. In some implementations, the noise is added to the virtual content by tiling the noise pattern over the virtual content. In some implementations, the noise pattern is randomly tiled over the virtual content. In some implementations, the noise pattern is first weighted according to a luminance response function, e.g., one that makes use of the per pixel luminance of the rendered virtual content, and then combined with the virtual content. In some implementations, noise is only added to one or a few of the virtual objects and is not added to one or more other of the virtual objects. For example, noise may not be added to user interface elements that are not supposed to look as though the elements are imaged through the camera.

The CGR content may include the second image or be composited with the second image, or the CGR content may be composited with a third image. In various implementations, virtual content (with added noise) is combined with images from a camera in various different ways. In one implementation, a processor (e.g., a graphics processing unit (GPU)) renders the second image into a frame buffer then renders the virtual content into the same buffer, which is then read out to the display. In another implementation, the processor (e.g., GPU) renders virtual content into a frame buffer. A compositor is used to composite the virtual content frame buffer with the second image, e.g., with the image received from the camera ISP. In this example, the second image is never rendered by the processor, e.g., GPU. In a similar implementation, rather than compositing with the second image, the virtual content frame buffer is composited with a third image. Doing so may be appropriate, for example, in the circumstance in which, by the time the process gets to render and composite, the second image (which was used to determine noise parameters) is too old. Instead, the process uses a more recent (third) image for compositing and display in an effort to minimize latency.

In video content, the content of each frame can be adjusted to render CGR content with virtual content that is appropriately adjusted to match noise of the respective frame image. In some implementations, a first frame is analyzed during an CGR experience and noise model parameters determined for use in that frame and a number of subsequent frames, e.g., the next 59 frames on the assumption that noise will change little over the course of short time periods and in cases where it is desirable to conserve processing resources or otherwise balance processing efficiency and speed with noise simulation accuracy. In some implementations, a first frame is analyzed during an CGR experience and a noise texture pattern is generated (e.g., via a live parameter generation-based technique or a live parameter lookup-based technique) and the noise texture pattern is used in that frame and a number of subsequent frames (e.g., the next 89 frames). Doing so may similarly conserve processing resources and improve speed. The noise texture pattern can be randomly tiled on the virtual object(s) so that the noise appears random (like real noise) from frame to frame over the length of the video.

Some implementations selectively add noise to virtual objects for some images but not add noise to virtual object for other images based on selection criteria. For example, the effect of/presence of noise may be more noticeable in low light conditions. Some implementations thus selectively determine to add noise to virtual objects based on determining that the light conditions are less than a particular threshold, e.g., adaptively turning on and off the virtual noise generation features. This can avoid wasting resources in bright environments in which the addition of noise to virtual objects is less noticeable.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method, comprising:
    at an electronic device having a processor:
        identifying noise data for a first image captured by an image capture device;
        creating a parameterized noise model based on the noise data;
        generating a noise pattern approximating noise in a second image using the parameterized noise model; and
        rendering computer-generated reality (CGR) content comprising:
            a first portion comprising the virtual content, the virtual content comprising noise added to the virtual content based on the noise pattern; and
            a second portion comprising content of the second image and comprising the noise in the second image.

2. The method of claim 1, wherein identifying the noise data comprises measuring camera noise for a plurality of different signal-to-noise ratio (SNR) levels using images captured by the image capture device in a plurality of different lighting conditions or imaging conditions.

3. The method of claim 1, wherein creating the parameterized noise model comprises identifying parameters of the parameterized noise model to fit the parameterized noise model to the noise data.

4. The method of claim 3, wherein identifying the parameters comprises:
    determining an intensity deviation and an associated spatial correlation based on the noise data; and
    identifying parameters for the parameterized noise model to produce output corresponding to the spatial correlation and intensity deviation distribution.

5. The method of claim 4, wherein the intensity deviation is determined by creating a difference image, the difference image comprising a difference between two images of measured noise, wherein the spatial correlation is determined based on shifting and correlating the difference image with itself.

6. The method of claim 4, wherein the parameterized noise model describes the spatial correlation via smoothing using a kernel described by a Gaussian mixture model.

7. The method of claim 1, wherein the second image is the first image, wherein parameters for the parameterized noise model are identified using images captured by the image capture device during the rendering of the CGR content.

8. The method of claim 1, wherein the second image is different from the first image, wherein parameters for the parameterized noise model for a plurality of different signal-to-noise ratio (SNR) levels are identified using images captured by the image capture device prior to the rendering of the CGR content.

9. The method of claim 8, wherein generating the noise pattern comprises:
    identifying a signal-to-noise ratio (SNR) level of the second image;
    identifying parameters based on the SNR level; and
    generating the noise pattern using the parameterized-noise model and the parameters.

10. The method of claim 9, wherein identifying the SNR level comprises receiving the SNR level from an image signal processor (ISP).

11. The method of claim 9, wherein identifying the SNR level comprises determining the SNR level using a machine learning model that assesses the second image.

12. The method of claim 1, wherein the noise pattern is precomputed for a signal-to-noise (SNR) range and the noise pattern is looked up for the second image at runtime based on identifying a SNR level of the second image.

13. The method of claim 1, wherein rendering the CGR content comprises tiling the noise pattern over the virtual content.

14. The method of claim 1, wherein rendering the CGR content comprises the second image, the CGR content is composited with the second image, or the CGR content is composited with a third image.

15. A system comprising:
    a non-transitory computer-readable storage medium; and
    one or more processors coupled to the non-transitory computer-readable storage medium, wherein the non-transitory computer-readable storage medium comprises program instructions that, when executed on the one or more processors, cause the system to perform operations comprising:
        identifying noise data for a first image captured by an image capture device;
        creating a parameterized noise model based on the noise data;
        generating a noise pattern approximating noise in a second image using the parameterized noise model; and
        rendering computer-generated reality (CGR) content comprising:
            a first portion comprising the virtual content, the virtual content comprising noise added to the virtual content based on the noise pattern; and
            a second portion comprising content of the second image and comprising the noise in the second image.

16. The system of claim 15, wherein creating the parameterized noise model comprises identifying parameters of the parameterized noise model to fit the parameterized noise model to the noise data.

17. The system of claim 16, wherein identifying the parameters comprises:
- determining an intensity deviation and an associated spatial correlation based on the noise data; and
- identifying parameters for the parameterized noise model to produce output similar to the spatial correlation and intensity deviation distribution.

18. The system of claim 17, wherein determining the intensity deviation comprises creating a difference image, the difference image comprising a difference between two images of measured noise, wherein the spatial correlation is determined based on shifting and correlating the difference image with itself.

19. A non-transitory computer-readable storage medium, storing program instructions computer-executable on a computer to perform operations comprising:
- identifying noise data for a first image captured by an image capture device;
- creating a parameterized noise model based on the noise data;
- generating a noise pattern approximating noise in a second image using the parameterized noise model; and
- rendering computer-generated reality (CGR) content comprising:
  - a first portion comprising the virtual content, the virtual content comprising noise added to the virtual content based on the noise pattern; and
  - a second portion comprising content of the second image and comprising the noise in the second image.

20. The non-transitory computer-readable storage medium of claim 19, wherein creating the parameterized noise model comprises identifying parameters of the parameterized noise model to fit the parameterized noise model to the noise data.

* * * * *